United States Patent
Horie et al.

(10) Patent No.: US 7,255,809 B2
(45) Date of Patent: Aug. 14, 2007

(54) POLISHING SLURRY FOR TEXTURING

(75) Inventors: Yuji Horie, Tokyo (JP); Hiromitsu Okuyama, Tokyo (JP)

(73) Assignee: NIHON Micro Coating Co., Ltd., Tokyo (JP)

( * ) Notice: Subject to any disclaimer, the term of this patent is extended or adjusted under 35 U.S.C. 154(b) by 151 days.

(21) Appl. No.: 10/675,714

(22) Filed: Sep. 29, 2003

(65) Prior Publication Data

US 2004/0112867 A1 Jun. 17, 2004

(30) Foreign Application Priority Data

Nov. 26, 2002 (JP) .............................. 2002-382645

(51) Int. Cl.
*C09K 13/00* (2006.01)

(52) U.S. Cl. .................... 252/79.1; 252/79.4; 438/692; 216/88; 216/89

(58) Field of Classification Search ............... 252/79.1, 252/79.4; 451/28, 36; 216/88, 89; 438/692
See application file for complete search history.

(56) References Cited

U.S. PATENT DOCUMENTS

| | | | | |
|---|---|---|---|---|
| 5,071,708 A | * | 12/1991 | Komaki et al. ............. 428/403 |
| 5,486,134 A | * | 1/1996 | Jones et al. ................. 451/209 |
| 6,258,721 B1 | * | 7/2001 | Li et al. ...................... 438/693 |
| 6,365,520 B1 | * | 4/2002 | Rhoades et al. ............ 438/690 |
| 6,533,644 B1 | * | 3/2003 | Horie et al. .................. 451/36 |
| 6,544,599 B1 | * | 4/2003 | Brown et al. ............... 427/475 |
| 2003/0194961 A1 | * | 10/2003 | Kendall et al. ............. 451/528 |
| 2004/0241379 A1 | * | 12/2004 | Horie et al. ............... 428/65.3 |

FOREIGN PATENT DOCUMENTS

| | | | |
|---|---|---|---|
| JP | 4362397 | * | 12/1992 |
| JP | 5-156239 | * | 6/1993 |
| JP | 08-7264 A | * | 1/1996 |
| JP | 08007264 A | * | 1/1996 |

OTHER PUBLICATIONS

Buehler METADI Diamond suspensions, no date.*

* cited by examiner

*Primary Examiner*—Shamim Ahmed
(74) *Attorney, Agent, or Firm*—Beyer Weaver LLP

(57) ABSTRACT

Polishing slurry for texturing the surface of a magnetic hard disk substrate has abrading particles with diameters in the range of 1-10 nm dispersed in a dispersant such as water and a water-based aqueous solution. The abrading particles may be monocrystalline diamond particles, polycrystalline diamond particles or cluster particles with monoerystalline and polycrystalline diamond particles.

9 Claims, 5 Drawing Sheets

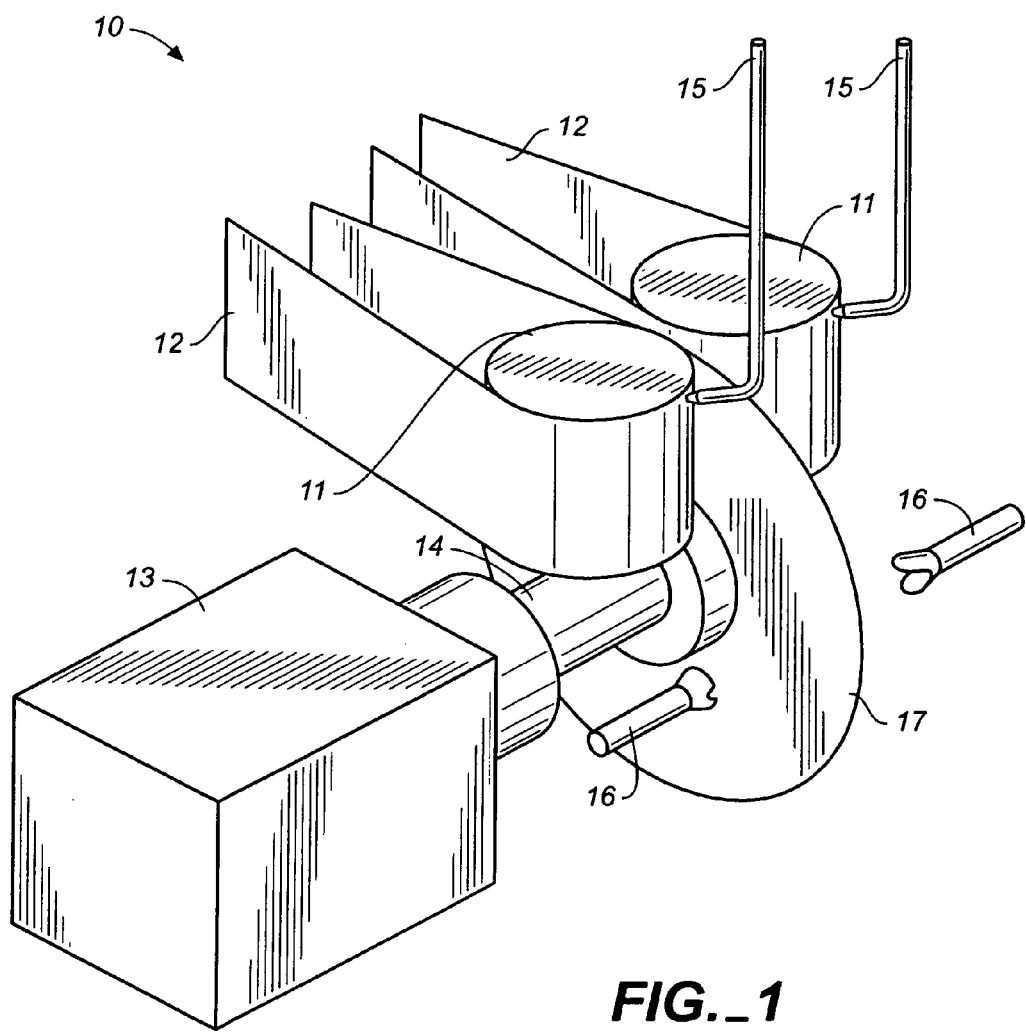
FIG._1
*(PRIOR ART)*

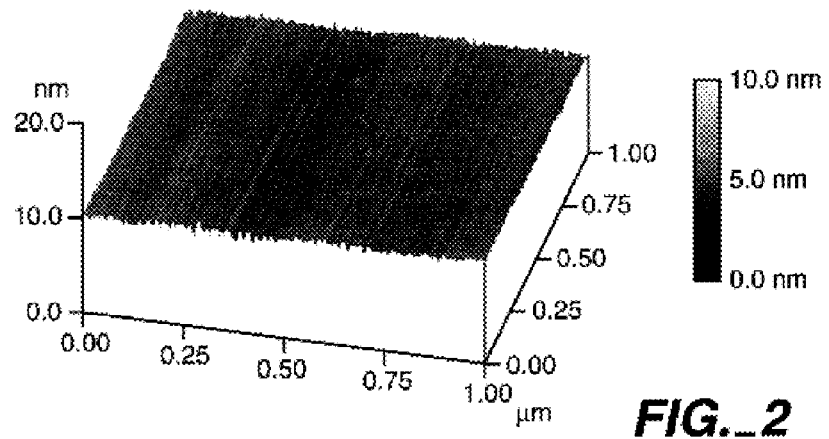
FIG._2
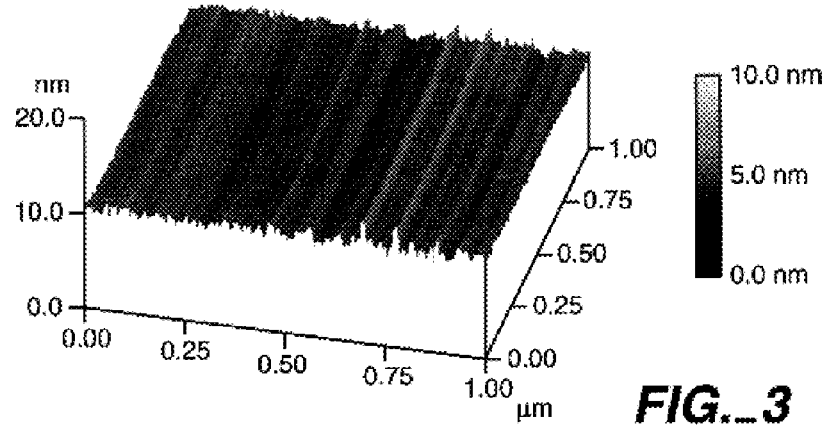
FIG._3
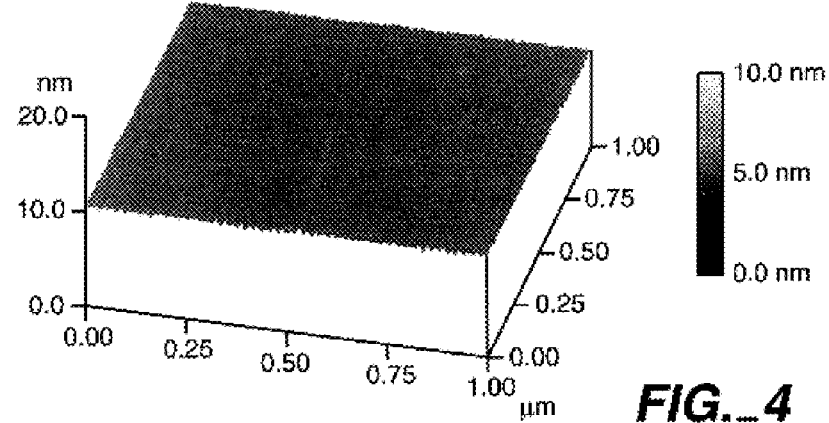
FIG._4

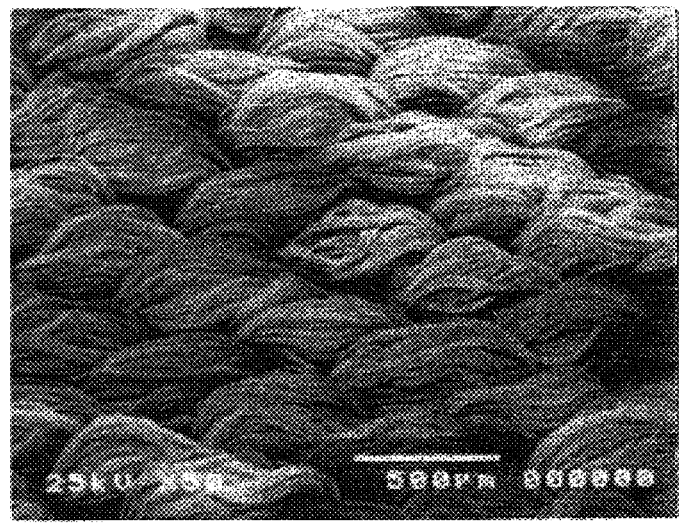
FIG._5A
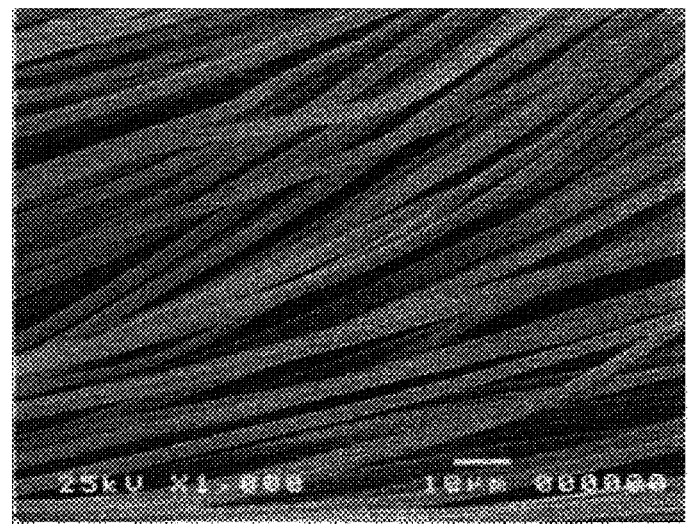
FIG._5B

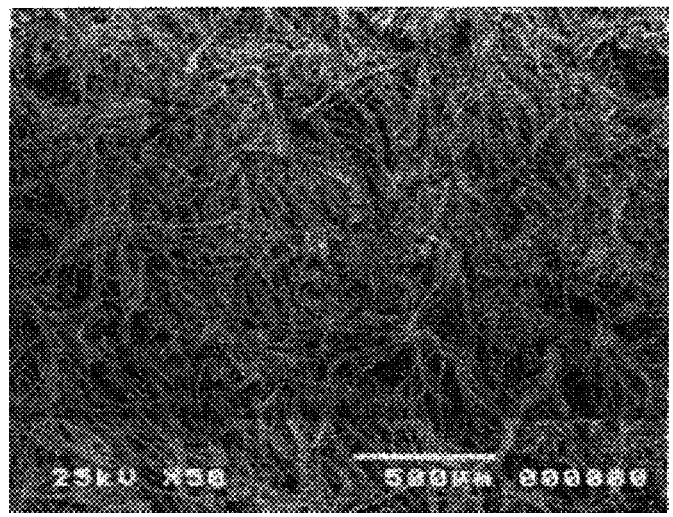
FIG._6A
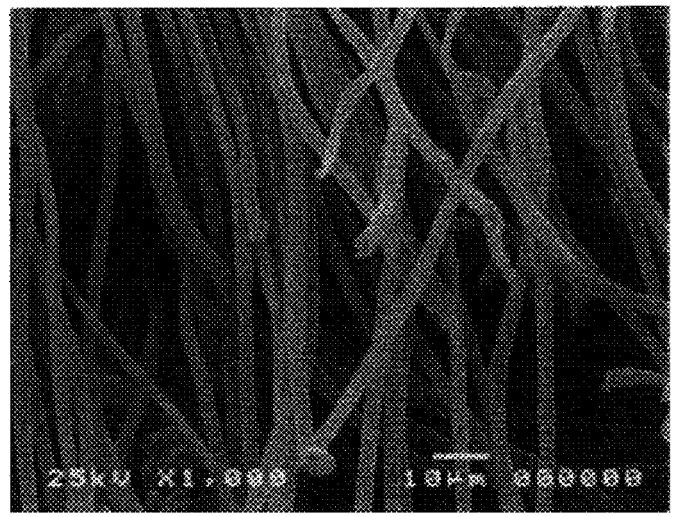
FIG._6B

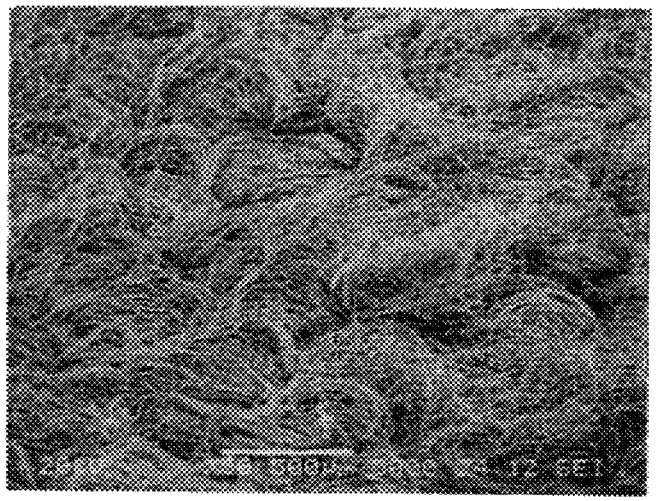
FIG.\_7A
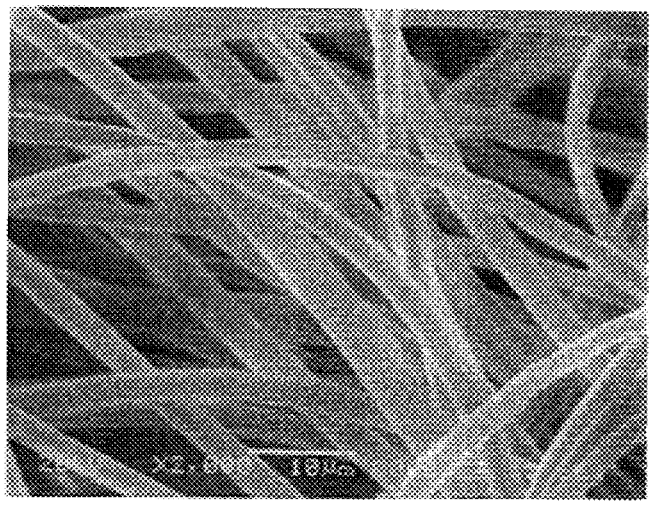
FIG.\_7B

POLISHING SLURRY FOR TEXTURING

BACKGROUND OF THE INVENTION

This invention relates to polishing slurry for texturing the surface of a magnetic hard disk substrate.

With the increase in the memory capacity of magnetic hard disks in recent years, it is becoming required to reduce the floating distance of a magnetic head from the surface of the magnetic hard disk to less than 50 nm. In connection with this requirement to reduce the floating distance of a magnetic head, it is also becoming necessary to increase the density of texturing marks formed on the surface of magnetic hard disk substrates to greater than 80 lines/μm.

In order to reduce the floating distance of a magnetic head, it is generally necessary to prevent both adsorption and collision of the magnetic head to and with the surface of the magnetic hard disk.

In order to prevent the adsorption of a magnetic head, the surface of the magnetic hard disk must have a certain degree of roughness. For this reason, a so-called texturing process is carried out on the surface of magnetic hard disks to form approximately concentric circular indentations and protrusions referred to as texturing marks so as to thereby provide an appropriate degree of surface roughness, as well as to improve the magnetic characteristics by providing a magnetic directionality in the circumferential direction of the surface of the magnetic disk. In order to thus improve the magnetic characteristics, it is necessary to form very fine texturing marks and this means that the pitch of the texturing marks must be made very small or that the texturing marks must be formed at a very high density. For the purpose of preventing collision of a magnetic head, it is necessary that there be no abnormal protrusions on the textured surface of the magnetic hard disks.

In general, aluminum substrates having an alumite processing or a non-magnetic plating process such as Ni—P plating carried out on the surface or glass substrates are widely used as a magnetic hard disk.

A magnetic hard disk substrate is mirror-polished and thereafter subjected to a texturing process for forming texturing marks on the surface. A magnetic hard disk is produced by forming a magnetic layer and a protective layer sequentially on the surface of this magnetic hard disk substrate by a known film-forming technology such as sputtering. Concentric circular protrusions and indentations are formed on the surface of this magnetic hard disk approximately similarly to the texturing marks formed on the surface of the magnetic hard disk substrate.

Since these protrusions and indentations formed on the surface of the magnetic hard disk are the results of the magnetic layer and the protective layer formed on top of the protrusions and indentations on the surface of the magnetic hard disk substrate, they are higher and sloped somewhat more gently than those formed on the surface of the magnetic hard disk substrate. Thus, very fine texturing marks must be formed accurately on the surface of a magnetic hard disk substrate without any abnormal protrusions.

It should be clear from the above explanation that the process of texturing is a very important step in the production of magnetic hard disks (as magnetic memory media) installed in a magnetic recording device or the like which is an external memory device of a computer. Indeed, it is important enough to control the recording density and the reliability of magnetic hard disks.

Such a texturing process is carried out by supplying polishing slurry on the surface of a rotating magnetic hard disk and pressing and running a polishing tape thereon. Approximately concentric circular texturing marks are thereby mechanically formed by means of free abrading particles. In this process, polishing slurry obtained by dispersing particles of one or more kinds of material selected from diamond, alumina and silica in a dispersing medium (dispersant) is used. A tape made of a material such as woven cloth, non-woven cloth, flocked fabric and foamed material is used as the polishing tape.

For forming very fine texturing marks without abnormal protrusions accurately on the surface of a magnetic hard disk substrate, the material, diameter and shape of abrading particles to be contained in polishing slurry have been examined and diamond particles are now coming to be used widely because diamond has superior properties regarding resistance against wear, heat, oxidation and chemicals.

There are two kinds of diamond particles, that is, monocrystalline diamond particles and polycrystalline diamond particles. Monocrystalline diamond particles are polygonal particles with corners around them while polycrystalline diamond particles are rounded particles with no corners around them. Fine texturing marks can be formed on the surface of a magnetic hard disk substrate by a texturing process using such monocrystalline and polycrystalline diamond particles but since scratches and abnormal protrusions tend to result if monocrystalline diamond particles are used, polycrystalline diamond particles are now being used as diamond particles.

As shown in Japanese Patent Publication Tokkai 6-150304 (in paragraphs 0007, 0008, 0017 and 0018), for example, conventional texturing processes using abrading particles comprising diamond particles are comprised of two stages. The texturing process of the first stage is carried out by using a polishing tape having affixed thereon abrading particles with relatively strong grinding power. In the subsequent second stage, abnormal protrusions formed on the surface of the magnetic hard disk substrate in the first stage are removed by a free particle polishing method by using polishing slurry having dispersed therein abrading particles comprising polycrystalline diamond particles with average diameter less than 1 μm. Since polycrystalline diamond particles are round particles with no corners around them, as explained above, having a relatively low grinding power, they can be used conveniently for the purpose of removing abnormal protrusions formed in the first stage. In other words, texturing marks without abnormal protrusions can be formed as a synergistic effect of the first and second stages of texturing process.

This prior art technology is disadvantageous in that two stages are required and that texturing takes time and is costly. Moreover, the second stage is only for removing abnormal protrusions and, since the density of the texturing marks depends only on the first stage, fine texturing marks at recently required high densities (such as 80 lines/μm or higher) cannot be formed.

Japanese Patent Publication Tokkai 11-138424 (in paragraphs 0014-0016) discloses another texturing technology by means of abrading particles comprising polycrystalline diamond particles wherein use is made of slurry obtained by dispersing polycrystalline diamond particles in the form of primary particles within a liquid dispersant. This is because it was believed that the diameters of abrading particles would become irregular if secondary particles (coagulating particles) are present in the polishing slurry, causing scratches and abnormal protrusions to be formed on the surface of the magnetic hard disk substrate and preventing uniform texturing marks from being formed. With such polishing slurry using polycrystalline diamond particles in the form of primary particles as abrading particles, however, texturing marks cannot be formed at densities of 80 lines/μm or higher.

It is generally known that abrading particles with even smaller diameters must be used for forming finer texturing marks and also that abrading particles with uniform diameters must be used in order to form uniform texturing marks. If only the diameters of abrading particles were made smaller in the aforementioned prior art technology as a polishing tape made of woven or non-woven cloth or flocked fabric is used as a polishing tape in a texturing process, the abrading particles would easily pass through the fibers constituting such a polishing tape. If a tape made of a foamed material is used as a polishing tape, such abrading particles would be captured easily inside indentations formed by bubbles on the surface of the polishing tape and would not act uniformly over the surface of the magnetic hard disk substrate. As a result, their grinding force is adversely affected either locally or entirely over the surface of the magnetic hard disk substrate and a surface with uneven roughness would result. In other words, fine texturing marks cannot be formed uniformly and accurately.

Japanese Patent Publication Tokkai 2002-30275 (in paragraphs 0012-0017) discloses another texturing technology using polycrystalline diamond particles as abrading particles wherein use is made of slurry obtained by dispersing in a dispersing medium coagulated polycrystalline diamond particles in the form of secondary particles produced by positively causing polycrystalline diamond particles with diameter of primary particles less than 20 nm. In this technology, the primary particles are caused to coagulate such that apparent diameters of individual abrading particles (secondary particles) become larger (say, 0.05-0.5 μm) and hence the aforementioned problems of the other prior art texturing technologies (such as the abrading particles easily moving through the fibers of a polishing tape) may be overcome.

Moreover, since the plurality of very small primary particles which are around the abrading particles (secondary particles) act on the surface of the magnetic hard disk substrate, fine texturing marks can be thereby formed on the surface of the magnetic hard disk substrate. The secondary particles, which are relatively larger, are broken up by the pressure with which the polishing tape is pressed such that the generation of scratches and abnormal protrusions on the surface of the magnetic hard disk substrate can be inhibited.

If use is made of slurry having coagulated polycrystalline diamond particles (secondary particles) comprising coagulated polycrystalline diamond particles with primary particles having diameters less than 10 nm dispersed in a dispersing medium, the valley portions of the texturing marks become too shallow and there arises the problem that fine texturing marks cannot be accurately created.

SUMMARY OF THE INVENTION

It is therefore an object of this invention in view of the problems of prior art technologies to provide new polishing slurry for forming very fine texturing marks on the surface of a magnetic hard disk substrate at a density greater than 80 marks/μm in the direction of the radius without abnormal protrusions.

This invention relates to polishing slurry for and a method of texturing the surface of a magnetic hard disk substrate. Polishing slurry according to this invention is characterized not only as comprising abrading particles and a dispersant therefor which may be water or a water-based aqueous solution but also wherein monocrystalline diamond particles, polycrystalline diamond particles or cluster particles comprising monocrystalline and polycrystalline diamond particles with diameters in the range of 1-10 nm are used as the abrading particles. Coagulated cluster particles that are coagulated particles of these cluster particles may also be further included. Such abrading particles are contained in an amount of 0.01 weight % or more, preferably in the range of 0.01-3 weight % and even more preferably in the range of 0.01-1 weight % with respect to the total of the polishing slurry. The water-based aqueous solution is an aqueous solution having an additive added to water. The additive to be added according to this invention may be one or more selected from non-ionic surfactants, organic phosphoric acid esters, higher fatty acid amides, glycol compounds, higher fatty acid salts and anionic surfactants. The content of the additive in the polishing slurry is to be in an amount of 1-10 weight % with respect to the total of the polishing slurry.

A texturing method of this invention may be characterized as comprising the steps of rotating a magnetic hard disk substrate, supplying polishing slurry of this invention on a surface of the magnetic hard disk substrate and pressing a polishing tape on the surface and running the polishing tape. The polishing tape may be of woven cloth, unwoven cloth, flocked cloth, raised cloth or a foamed material. Of these materials for the polishing tape, woven cloth, unwoven cloth and raised cloth may comprise polyester and/or nylon microfibers of thickness in the range of 0.1-5 μm. Only the planted piles of the flocked cloth and the raised portion of the raised cloth, that is, only the portion of flocked and raised cloths that contacts the surface of the magnetic hard disk being polished may comprise microfibers of thickness within the range given above. As for tapes of a foamed material, there are many indentations formed by air bubbles and their diameters are in the range of 0.1-5 μm.

According to the present invention, cluster particles and coagulated cluster particles contained in the polishing slurry embodying this invention supplied to the surface of a magnetic hard disk substrate are decomposed to an appropriate degree by the pressure applied by the polishing tape such that deep scratches and abnormal protrusions are not formed. Since such decomposed particles act on the surface of the magnetic hard disk substrate, fine texturing marks can be formed on the surface of the magnetic hard disk. Since such decomposed particles have sharper edges than coagulated polycrystalline diamond particles, finer texturing marks can be formed than by means of coagulated polycrystalline diamond particle.

The present invention is applicable to the texturing of the surface of any prior art magnetic hard disk substrate including aluminum substrates produced by mirror-polishing the surface of a disk of an aluminum alloy and thereafter forming an electroless plating layer of Ni—P thereon or glass substrates. The present invention is particularly adapted to the forming of fine texturing marks on a disk of a very hard and very rigid material such as a glass substrate.

BRIEF DESCRIPTION OF THE DRAWINGS

FIG. 1 shows an example of polishing device which can be used for carrying out a texturing process according to this invention.

FIG. 2 is a photograph of a computer-generated image of the surface of a glass substrate after a texturing process according to this invention.

FIG. 3 is a photograph of a computer-generated image of the surface of a glass substrate after a texturing process of Comparison Example 1.

FIG. 4 is a photograph of a computer-generated image of the surface of a glass substrate after a texturing process of Comparison Example 2.

FIG. 5A is a plan view (enlarged 50 times) of the surface of a woven cloth comprising microfibers and FIG. 5B is an enlarged (by 1000 times) view of microfibers constituting the woven cloth of FIG. 5A.

FIG. 6A is a plan view (enlarged 50 times) of the surface of an unwoven cloth comprising microfibers and FIG. 6B is an enlarged (by 1000 times) view of microfibers constituting the unwoven cloth of FIG. 6A.

FIG. 7A is a plan view (enlarged 50 times) of the surface of a raised cloth comprising microfibers and FIG. 7B is an enlarged (by 2000 times) view of microfibers constituting the raised cloth of FIG. 7A.

DETAILED DESCRIPTION OF THE INVENTION

Polishing slurry according to this invention is characterized as comprising abrading particles and a dispersion medium ("dispersant") which disperses these abrading particles. Monocrystalline diamond particles, polycrystalline diamond particles or cluster particles composed of these monocrystalline and polycrystalline diamond particles with diameters within the range of 1-10 nm are used as the abrading particles. The abrading particles need not entirely be cluster particles. So-called coagulated cluster particles formed by cluster particles coagulating within a dispersant may be used as abrading particles together with cluster particles. According to this invention, cluster particles and coagulated particles within polishing slurry of this invention are decomposed to an appropriate degree as the slurry is supplied onto the surface of a magnetic hard disk substrate and pressed by a polishing tape and such decomposed particles also act on the surface of the magnetic hard disk substrate together with the cluster particles and coagulated cluster particles.

For texturing the surface of a glass substrate made of an unreinforced, reinforced or crystallized glass material, it is desirable to use cluster particles composed of monocrystalline diamond particles. It is because the surface of a glass substrate is hard and hence polygonal monocrystalline diamond particles with many corners, rather than rounded polycrystalline diamond particles, can exhibit a higher grinder power.

Cluster particles may be obtained by the explosion-synthesis method known for the production of diamond particles (such as disclosed in Japanese Patent Publication Tokkai 2000-136376) whereby a starting material comprising a metallic catalyst (Co, Ni, Fe, etc.) and graphite powder is impulse-compressed at a high temperature by the explosion of an explosive. Those containing a relatively small amount of graphite not reacted are preferred. Cluster particles thus obtained are tasseled assemblies of very small crystalline particles with no directionality.

The diameters of the monocrystalline and polycrystalline diamond particles are within the range of 1-10 nm because if monocrystalline and polycrystalline diamond particles with diameters in excess of 10 nm are used, more scratches and protrusion are generated and if monocrystalline and polycrystalline diamond particles with diameters less than 1 nm are used, the work efficiency is adversely affected.

The content of abrading particles should be 0.01 weight % with respect to the total amount of the polishing slurry. It is preferably in the range of 0.01-3 weight % and more preferably in the range of 0.01-1 weight %. If the content of the abrading particles is less than 0.01 weight %, it is difficult to form texturing marks accurately and at a high density on the surface of a magnetic hard disk substrate. If the content of the abrading particles exceeds 3 weight %, there is no change in the density or shape of the texturing marks formed on the surface of a magnetic hard disk substrate. In other words, texturing marks can be formed on the surface of a magnetic hard disk substrate at a density greater than 80 lines/μm in the radial direction already with the content of the abrading particles less than 3 weight % (say, 1 weight %) and hence it is economically advantageous to keep the content of the abrading particles below 3 weight % to reduce the material cost.

Water or a water-based aqueous solution is used as the dispersant. Such a water-based aqueous solution is produced by adding to water a water-soluble additive with a good washing capability that can improve dispersion of cluster particles and coagulated cluster particles in the polishing slurry of this invention and also the lubricity during the texturing process. Examples of such water-based aqueous solution include solutions obtained by adding to water one or more additives such as non-ionic surfactants, organic esters of phosphoric acid, higher fatty acid amides, glycol compounds, higher fatty acid salts and anionic surfactants. The content of such an additive (or additives) is within the range of 1-10 weight % with respect to the entire amount of the polishing slurry.

Examples of non-ionic surfactant to be used as an additive include the higher alcohol type, the twin type, the pluronic type and the sorbitan type. Examples of organic esters of phosphoric acid include the aromatic salt type, the aliphatic salt type and the aliphatic acid type. Examples of higher fatty acid amide include lauric acid diethanol amide, ersinic acid diethanol amide, ricinoric acid isodipropanol amide and stearic acid diethanol amide. Examples of glycol compounds include alkylene glycols, polyethylene glycols and polypropylene glycols. Examples of higher fatty acid salt include potassium ricinoleate and potassium oleate. Examples of anionic surfactant include alkyl benzene sulfonic acid, sodium dodecil sulfate and sodium stearate. Additives of appropriate kinds should be selected, depending upon the kind and the surface condition of the magnetic hard disk substrate to be processed.

FIG. 1 shows an example of polishing device 10 capable of carrying out a texturing method of this invention (such as disclosed in Japanese Patent Publications Tokkai 11-908010 and 11-161946. Although it is a polishing device of the type adapted to carry out a texturing process on both surfaces of a magnetic hard disk substrate 17 at the same time, a polishing device of another kind (such as disclosed in Japanese Patent Publication Tokkai 6-195701) for texturing only one surface at a time.

For carrying out a texturing process according to this invention, the magnetic hard disk substrate 17 is set to a shaft 14 connected to a driver motor 13 and thereafter the driver motor 13 is switched on to rotate the magnetic hard disk substrate 17. Polishing slurry of this invention is supplied onto both surfaces of the magnetic hard disk substrate 17 through nozzles 15 and polishing tapes 12 are pressed through contact rollers 11 onto the surfaces of the magnetic hard disk substrate 17 while the polishing tapes 12 are caused to run. After the texturing process, a cleaning liquid such as water is projected onto the surfaces of the magnetic hard disk substrate 17 through nozzles 16 to clean the magnetic hard disk substrate 17 while the magnetic hard disk substrate 17 is kept rotating.

Examples of the polishing tape include woven cloth tapes, unwoven cloth tapes, flocked fabric tapes and tapes comprising a foamed material. The woven cloth, unwoven cloth and raised cloth are comprised of fibers with thickness in the range of 0.1-5 µm, referred to as microfibers. Views of the surface of a woven cloth (enlarged 50 times) and that of the microfibers constituting this-woven cloth (enlarged 1000 times) are respectively shown in FIGS. 5A and 5B. Views of the surface of an unwoven cloth (enlarged 50 times) and that of the microfibers constituting this unwoven cloth (enlarged 1000 times) are respectively shown in FIGS. 6A and 6B. Views of the surface of a raised cloth (enlarged 50 times) and that of the microfibers constituting this raised cloth (enlarged 2000 times) are respectively shown in FIGS. 7A and 7B.

Examples of flocked fabric that may be used include those obtained by attaching hairs known as piles onto the surface of a woven cloth, an unwoven cloth or a plastic sheet by a known electrostatic hair planting process, as well as those obtained by sewing piles and tufts (fibers made into loops or tassels) onto a woven or unwoven cloth. Woven and unwoven cloths which serve as the base for such flocked fabric need not comprise microfibers as long as the piles or the tufts themselves of the flocked fabric are microfibers of the thickness described above. Aforementioned raised cloth is obtained by cutting a portion of the fibers constituting the surface fiber system of a woven cloth comprising microfibers and raising these fibers. Only the raised portions may comprise microfibers. The raised cloth may be one wherein either the warps or wefts of the fiber structure of a woven cloth are microfibers which are cut and raised.

Thus, at least a surface portion (that is, the portion that comes to directly contact the surface of a magnetic hard disk substrate during a polishing process) of a tape made of such a woven, unwoven, flocked or raised cloth is formed with microfibers with thickness in the range of 0.1-5 µm. This is for the purpose of allowing the abrading particles to be appropriately held on the surface portion of the tape coming into contact with the surface of a magnetic hard disk substrate such that fine texturing marks can be formed at a high density on the surface of the magnetic hard disk substrate. If the thickness of the contacting fibers of the tape is less than 0.1 µm, the points of contact between the fibers at the surface portions of the tape and the abrading particles become too few and the abrading particles cannot act sufficiently on the surface of the magnetic hard disk substrate. This affects the grinding power adversely and texturing marks cannot be formed clearly and accurately. If the thickness of these fibers is greater than 5 µm, on the other hand, the step differences between fibers constituting the tape surface become too large and fine texturing marks cannot be formed uniformly on the surface of the magnetic hard disk substrate.

Tapes made of a foamed material have voids scattered throughout therein that are formed by bubbles generated when the foamed material was obtained. Indentations due to such voids are scattered over the surface of a tape made of such a foamed material. The diameters of these surface indentations are in the range of 0.1-5 µm.

The invention is described next by way of test and comparison examples.

TEST EXAMPLE

A polishing device as shown in FIG. 1 was used to carry out a texturing process on the surfaces of a glass substrate for a magnetic hard disk.

Polishing slurry with composition as shown in Table 1 was used, A high-concentration stock solution was preliminarily prepared and the polishing slurry as shown in Table 1 was obtained by diluting this stock solution with pure water. This was because it is a common practice to make such a high-concentration (say, 10 times or 100 times) stock solution available to the user such that the user has only to dilute it with water for actual use. Cluster particles comprising monocrystalline diamond particles with diameters within the range of 1-10 nm produced by an explosion-synthesis method were used. As an additive to the dispersant for these cluster particles, a surfactant of glycol compound (alkylene glycol) was used.

TABLE 1

| | |
|---|---|
| Cluster particles | 0.05 weight % |
| Additive (surfactant of glycol compound) | 5 weight % |
| Pure water | 94.95 weight % |

A tape of a woven cloth of thickness 700 µm comprising nylon fibers of thickness about 2 µm was used as the polishing tape.

The texturing process on the surfaces of the glass substrate was carried out under the conditions shown in Table 2 below.

TABLE 2

| | |
|---|---|
| Rotary speed of glass substrate | 400 rpm |
| Running speed of tape | 6 cm/minute |
| Supply rate of polishing slurry | 15 cc/minute |
| Hardness of contact rollers | 60 duro |
| Oscillation (amplitude) | 5 Hz (1 mm) |
| Pressure by contact rollers | 4.5 kg |

Comparison Tests

Results of aforementioned Test Example were compared with those of Comparison Examples 1 and 2 described below regarding the average surface roughness (Ra) and maximum height (Rmax) of the glass substrate after the texturing process and the line density of texturing marks on the surface of the glass substrate.

The average surface roughness (Ra) and maximum height (Rmax) of the glass substrate after the texturing process were measured by using a scan-type probe microscope (Nanoscope Dimension 3100 Series, produced by Digital Instrument Co.) and the line densities of texturing marks on the surfaces of glass substrates were measured from the photographs of computer-generated images after the texturing processes. These computer-generated images are each obtained by scanning 512 points over an arbitrarily selected area of 1.0 µm×1.0 µm on the surface of a glass substrate and presenting the result three-dimensionally. FIGS. 2, 3 and 4 respectively show results of Test Example, Comparison Example 1 and Comparison Example 2.

Comparison Example 1

Polishing slurry with composition as shown in Table 3 was used to carry out a texturing process on the surfaces of a glass substrate by using the same polishing device and polishing tape as used in Test Example under the conditions shown in Table 2. Coagulated polycrystalline diamond particles used as the abrading particles of the polishing slurry for Comparison Example 1 were polycrystalline diamond particles (primary particles) of average diameter 20 nm coagulated inside the dispersant. The same surfactant of glycol compound used in Test Example was also used as an additive.

TABLE 3

(Composition of polishing slurry for Comparison Example 1)

| | |
|---|---|
| Coagulated polycrystalline diamond particles (average diameter of primary particles = 20 nm) | 0.05 weight % |
| Additive (surfactant of glycol compound) | 5 weight % |
| Pure water | 94.95 weight % |

Comparison Example 2

Polishing slurry with composition as shown in Table 4 was used to carry out a texturing process on the surfaces of a glass substrate by using the same polishing device and polishing tape as used in Test Example under the conditions shown in Table 2. Coagulated polycrystalline diamond particles used as the abrading particles of the polishing slurry for Comparison Example 2 were polycrystalline diamond particles (primary particles) of average diameter 8 μnm (about the same diameter as the monocrystalline diamond particles constituting the cluster particles of Test Example) coagulated inside the dispersant. The same surfactant of glycol compound used in Test Example was also used as an additive.

TABLE 4

(Composition of polishing slurry for Comparison Example 2)

| | |
|---|---|
| Coagulated polycrystalline diamond particles (average diameter of primary particles = 8 nm) | 0.05 weight % |
| Additive (surfactant of glycol compound) | 5 weight % |
| Pure water | 94.95 weight % |

Results of Tests

Results of tests made on aforementioned Test and Comparison Examples are summarized in Table 5 below.

TABLE 5

| | Ra (Å) | Rmax (Å) | Line density (lines/μm) |
|---|---|---|---|
| Test Example | 1.8 | 25 | 85 |
| Comparison Example 1 | 4.0 | 65 | 55 |
| Comparison Example 2 | 1.0 | 15 | Lines not clear |

It should be clear from FIG. 5 that Test Example has smaller average surface roughness (Ra) and maximum protrusion height (Rmax) and more than 1.5 times as large line density of texturing marks than Comparison Example 1 and this means that more accurate texturing marks can be formed uniformly at a higher line density on a glass substrate if a method of this invention is used. Comparison Example 2 shows about the same average surface roughness and maximum protrusion height but clear texturing marks were not formed on the surface of the glass substrate and the line density of texturing marks could not be ascertained.

In summary, the present invention has the merit that fine texturing marks can be formed uniformly on the surface of a magnetic hard disk substrate without abnormal protrusions at a line density in the radial direction of greater than 80 lines/μm.

What is claimed is:

1. Polishing slurry for texturing a surface of a magnetic hard disk substrate, said polishing slurry comprising:
    abrading particles that are cluster particles with corners comprising monocrystalline diamond particles with diameters in the range of 1-10 nm said cluster particles being tasseled assemblies of crystalline particles with no directionality; and
    a dispersant for said abrading particles selected from the group consisting of water and water-based aqueous solutions.

2. The polishing slurry of claim 1 wherein said abrading particles further include coagulated cluster particles inside said dispersant, said coagulated cluster particles being coagulated particles of said cluster particles.

3. The polishing slurry of claim 1 containing said abrading particles in an amount of 0.01 weight % or greater with respect to the total of said polishing slurry.

4. The polishing slurry of claim 1 containing said abrading particles in an amount of 0.01-3 weight % with respect to the total of said polishing slurry.

5. The polishing slurry of claim 1 containing said abrading particles in an amount of 0.01-1 weight % with respect to the total of said polishing slurry.

6. The polishing slurry of claim 2 containing said abrading particles in an amount of 0.01-1 weight % with respect to the total of said polishing slurry.

7. The polishing slurry of claim 1 wherein said water-based aqueous solution is an aqueous solution having an additive added to water, said additive being of one or more material selected from the group consisting of non-ionic surfactants, organic phosphoric acid esters, higher fatty acid amides, glycol compounds, higher fatty acid salts, and anionic surfactants.

8. The polishing slurry of claim 7 wherein said additive is contained in an amount of 1-10 weight % with respect to the total of said polishing slurry.

9. The polishing slurry of claim 1 wherein said cluster particles are obtained by an explosion-synthesis method.

* * * * *

UNITED STATES PATENT AND TRADEMARK OFFICE
CERTIFICATE OF CORRECTION

PATENT NO. : 7,255,809 B2 Page 1 of 1
APPLICATION NO. : 10/675714
DATED : August 14, 2007
INVENTOR(S) : Horie et al.

It is certified that error appears in the above-identified patent and that said Letters Patent is hereby corrected as shown below:

Cover Page:

Item "(75) Inventors," add --Tatsuya Tanifuji, Tokyo (JP)--.

Signed and Sealed this

Twentieth Day of November, 2007

JON W. DUDAS
*Director of the United States Patent and Trademark Office*